United States Patent
Ruggiero et al.

(10) Patent No.: US 10,152,610 B2
(45) Date of Patent: *Dec. 11, 2018

(54) SENSITIVE DATA SERVICE ACCESS

(71) Applicant: Workday, Inc., Pleasanton, CA (US)

(72) Inventors: Jonathan David Ruggiero, Danville, CA (US); Bjorn Hamel, Dublin, CA (US); Darius Kasad, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/201,178

(22) Filed: Jul. 1, 2016

(65) Prior Publication Data

US 2018/0004972 A1    Jan. 4, 2018

(51) Int. Cl.
*G06F 21/62*      (2013.01)
*H04L 29/06*      (2006.01)

(52) U.S. Cl.
CPC ...... *G06F 21/6245* (2013.01); *H04L 63/0807* (2013.01); *H04L 63/104* (2013.01); *H04L 63/20* (2013.01)

(58) Field of Classification Search
CPC . G06F 21/6245; G06F 21/62; H04L 63/0807; H04L 63/20; H04L 29/06
USPC .................................................... 726/1
See application file for complete search history.

(56) References Cited

U.S. PATENT DOCUMENTS

| | | | |
|---|---|---|---|
| 8,312,516 B1 | 11/2012 | Malatesta | |
| 8,458,487 B1 * | 6/2013 | Palgon | ............... G06F 21/00 380/277 |
| 9,819,648 B1 | 11/2017 | Chilakapati | |
| 2001/0019614 A1 | 9/2001 | Madoukh | |
| 2012/0254116 A1 | 10/2012 | Thereska | |
| 2012/0317129 A1 * | 12/2012 | Qayyum | ........... G06F 17/30525 707/754 |
| 2014/0244963 A1 | 8/2014 | Pliss | |
| 2016/0078245 A1 | 3/2016 | Amarendran | |

* cited by examiner

*Primary Examiner* — Evans Desrosiers
(74) *Attorney, Agent, or Firm* — Van Pelt, Yi & James LLP

(57) ABSTRACT

A system for accessing data includes an interface and a processor. The interface is to receive a request to access data and requestor information. The processor is to determine whether the data comprises sensitive data configured to have an assigned access policy and an assigned storage policy; and in the event that the data comprises sensitive data configured to have the assigned access policy and the assigned storage policy, determine whether access is allowed based at least in part on the requestor information; and in the event that access is allowed, retrieve the data based on information provided by a token and provide the data.

13 Claims, 12 Drawing Sheets

SENSITIVE DATA SERVICE ACCESS

BACKGROUND OF THE INVENTION

Personal data is often collected and stored by corporations or service providers in order to manage customers and employees. For example, employee names and social security numbers or client names and purchase histories are acquired and stored for business purposes. As more companies move to online, world-wide transactions, ensuring the correct storage and access protocols for sensitive data has become a complex process. Due to specific country regulations, it is often necessary to store particular data elements in a specific country. Strict controls exist over access to sensitive data elements and the locations from which the data can be accessed.

BRIEF DESCRIPTION OF THE DRAWINGS

Various embodiments of the invention are disclosed in the following detailed description and the accompanying drawings.

DETAILED DESCRIPTION

Figure 1:
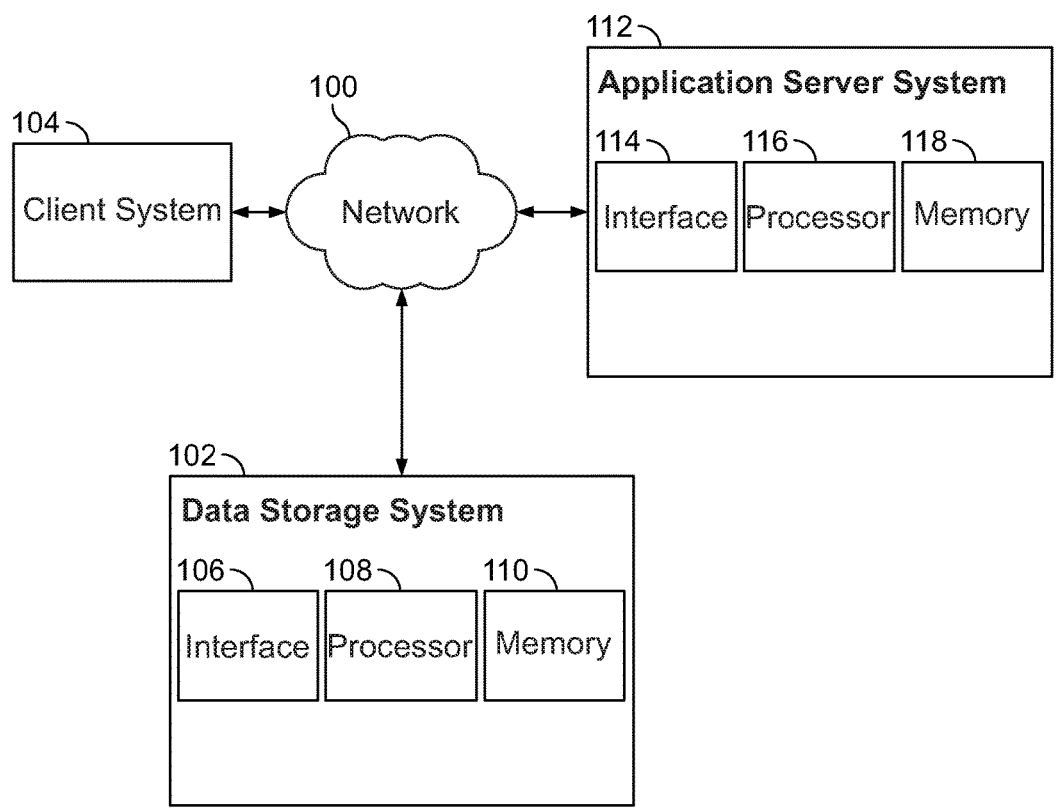
FIG. 1 is a block diagram illustrating an embodiment of a system for sensitive data storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for accessing sensitive data is disclosed. The system comprises an interface and a processor. The interface is to receive a request to access data and requestor information. The processor is to determine whether the data comprises sensitive data configured to have an assigned access policy and an assigned storage policy. In the event that the data comprises sensitive data configured to have an assigned access policy and an assigned storage policy, the processor determines whether access is allowed based at least in part on the requestor information. In the event that access is allowed, the processor retrieves the data based on information provided by a token and provides the data.

In some embodiments, the system for accessing sensitive data accesses sensitive data stored by a sensitive data storage system. In some embodiments, the sensitive data storage system receives data to be stored and determines a data group for the data. In some embodiments, the data group has an assigned access policy and an assigned storage policy, in which case the policies are assigned to the data. In some embodiments, an access policy or a storage policy is assigned based on a data location context. For example, the data location context of the data is used to look up a corresponding policy with the same data location context. In some embodiments, a corresponding policy with the same data location context does not exist, and therefore the data is not configured to have an assigned access policy or an assigned storage policy. In some embodiments, the data is stored in a storage system based on an assigned storage policy. In some embodiments, the storage system stores the data mapped to a token and returns the token to be stored in a second storage location, such as an application server system. In some embodiments, the application server system stores the token in place of the sensitive data and also stores the data location context.

In some embodiments, the token is stored in the application server such that the application server system does not store the sensitive data. In some embodiments, the storage system does not store contextual data. In some embodiments, the separation allows for secure storage of the sensitive data, because both the storage system and application server system need to be compromised in order to obtain both the sensitive data and the object owning the data. For example, the storage system stores a birth date and the application server stores an employee name. In some embodiments, the storage system and application server system are in physically separate locations, making the likelihood of a successful double attack on both systems very low. In some embodiments, the application server system encrypts the sensitive data with a key stored in the application server system before storing the data in the storage system. In some embodiments, the additional safeguard causes sensitive data to be difficult to decrypt and access in the event that it is retrieved from the storage system without the application server's approval.

In some embodiments, a processor determines whether the data has an assignable access policy or assignable storage policy. In some embodiments, the processor determines that the data comprises sensitive data configured to have an assigned access or storage policy in the event that a stored access or storage policy has a data location context matching the data location context of the requested data. In some embodiments, data cannot be assigned an access policy or a storage policy because the data location context of the data does not match the data location context of a stored access policy or a stored storage policy. In some embodiments, an access policy or a storage policy is stored in an application system. In some embodiments, data that cannot be assigned an access policy is stored as non-sensitive data regardless of an assigned storage policy. In some embodiments, data that cannot be assigned a storage policy but is assigned an access policy is stored as sensitive data in the application server and is only provided according to the access policy, but a token is not used.

In some embodiments, the system for accessing sensitive data works in tandem with a system for storing sensitive data. In some embodiments, the system for accessing sensitive data determines a data group for the data requested to be accessed. In some embodiments, the system assigns an access policy and/or a storage policy to the data based on the data group in the case that the data group has an associated policy. In some embodiments, the data location context of the data being requested to be accessed is used to assign an access policy and/or a storage policy to the data. In some embodiments, the processor determines that the data comprises sensitive data configured to have an assigned access policy in the event that a stored access policy has a data location context matching the data location context of the requested data. In some embodiments, data requestor information is examined to determine whether the requestor is allowed access to the data based on the assigned access policy. In some embodiments, in the event that access is allowed, the data is retrieved from a data storage system using a token. In some embodiments, the token is a key that points to a value in a key-value pair stored in the data storage system. In some embodiments, the data is decrypted after being retrieved. The data is then provided to the requestor.

FIG. 1 is a block diagram illustrating an embodiment of a system for sensitive data storage. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 104, application server system 112, and data storage system 102 communicate via network 100. In some embodiments, application server system 112 comprises interface 114, processor 116, and memory 118. In some embodiments, application server system 112 comprises a system for receiving sensitive data from a client via interface 114 and storing the data in data storage system 102. In some embodiments, application server system 112 comprises a system for receiving a request to access stored sensitive data via interface 114, retrieving the data from data storage system 102, and providing the data. In various embodiments, permissions are evaluated and/or data is classified by processor 116. In some embodiments, data classification information and permissions information are stored in memory 118. In some embodiments, information needed to carry out a sensitive data management system is stored in memory 118. In various embodiments, the network system comprises 1, 2, 5, 10, 22, 122, or any other appropriate number of client systems. In some embodiments, client system 104 provides client requests and data. In some embodiments, client system 104 provides data to a client. In some embodiments, data storage system 102 comprises interface 106, processor 108, and memory 110. In some embodiments, interface 106 receives and provides data and tokens. In some embodiments, memory 110 stores sensitive data. In some embodiments, processor 108 is used to determine whether data corresponding to a given token exists in memory 110, and if so, to retrieve the corresponding sensitive data. In some embodiments, data storage system 102 comprises personally identifiable information storage.

Figure 2:
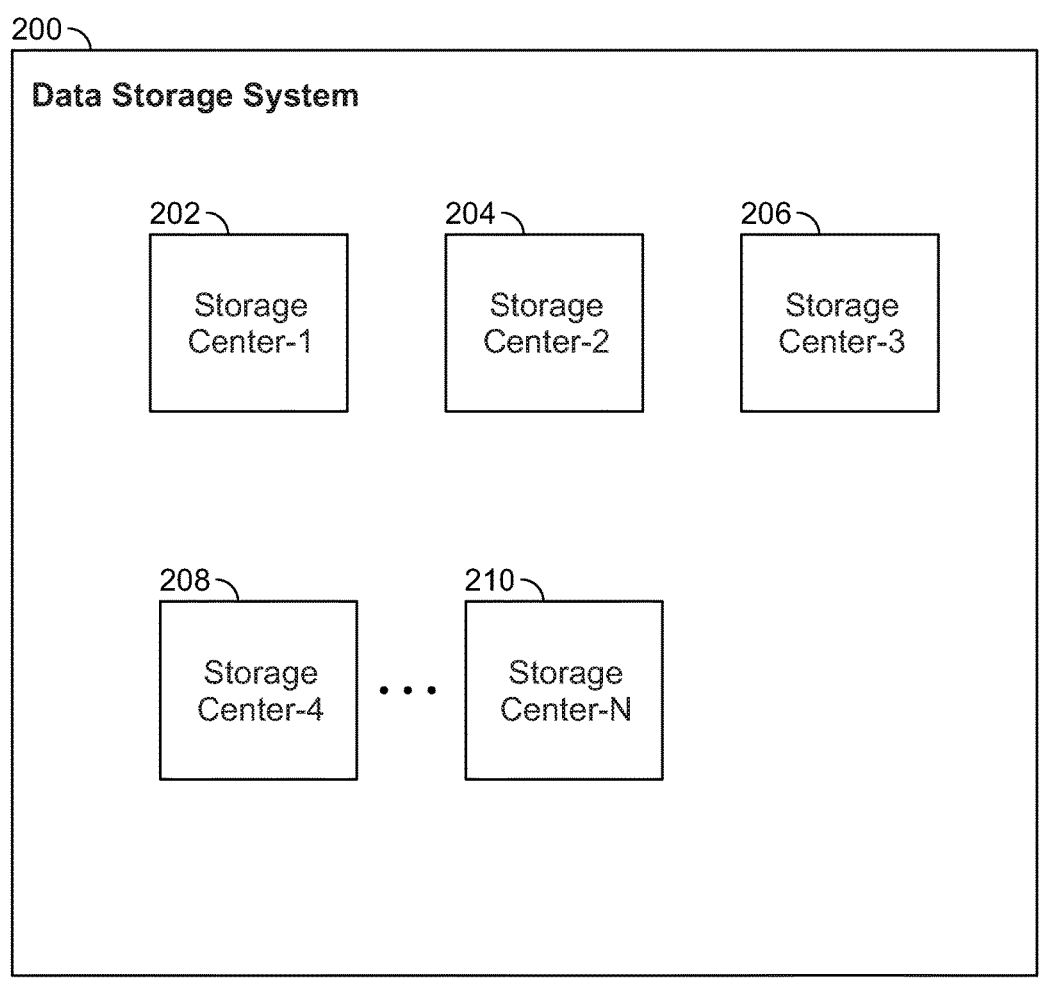
FIG. 2 is a block diagram illustrating an embodiment of a data storage system.

FIG. 2 is a block diagram illustrating an embodiment of a data storage system. In some embodiments, data storage system 200 comprises data storage system 102 of FIG. 1. In the example shown, data storage system 200 comprises storage center-1 202, storage center-2 204, storage center-3 206, storage center-4 208, and storage center-n 210. In various embodiments, the storage system comprises 1, 2, 5, 10, 22, 122, or any other appropriate number of storage centers. In some embodiments, a storage center comprises a server, system of servers, or computer memory location. In some embodiments, a storage center is associated with a geographical location, region, country, or sub-region. For example, storage center-1 is associated with France, and data designated to be stored in France is stored in storage center-1.

Figure 3:
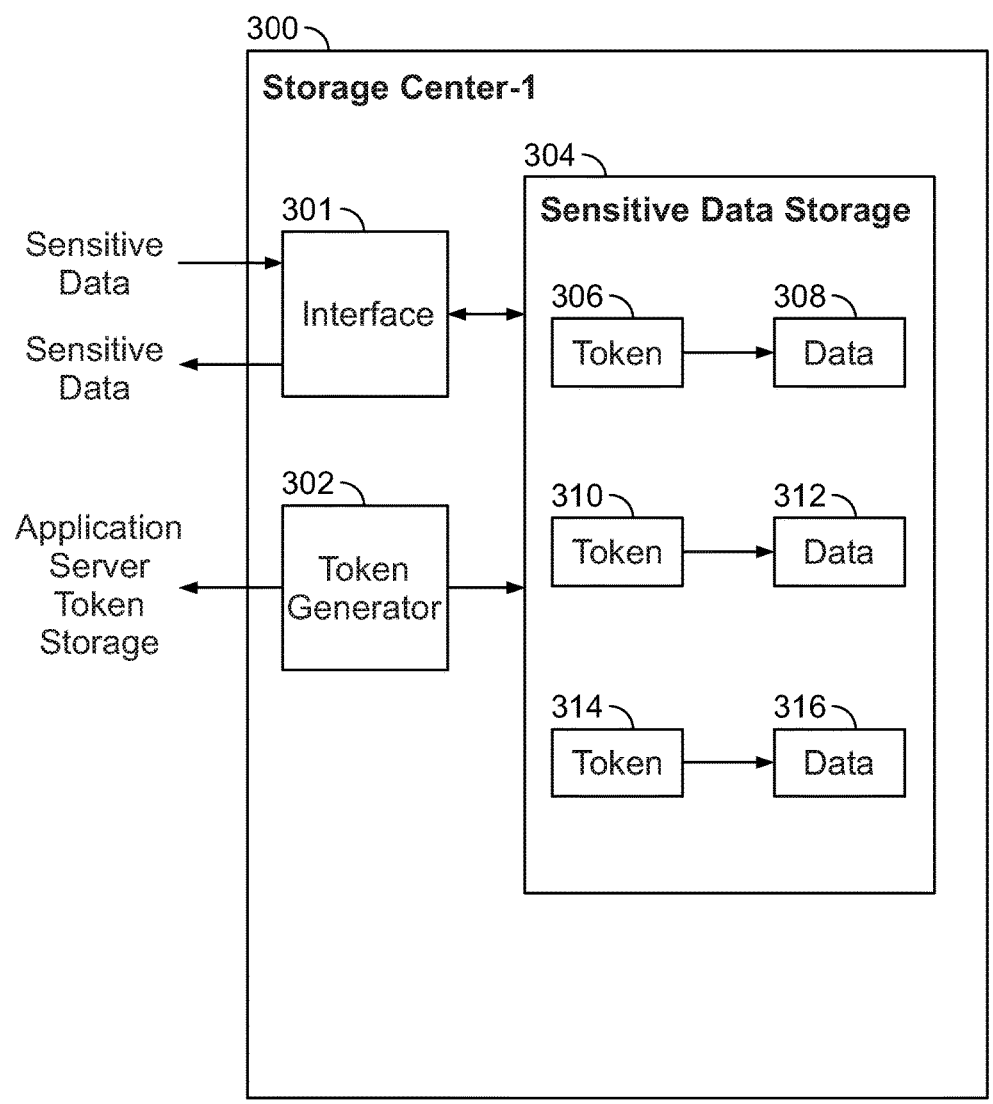
FIG. 3 is a block diagram illustrating an embodiment of a storage center.

FIG. 3 is a block diagram illustrating an embodiment of a storage center, for example, storage center-1 of FIG. 2. In some embodiments, storage center 300 comprises sensitive data storage 304. In the example shown, the sensitive data is stored mapped to a token. In some embodiments, the token to data mapping is immutable. In some embodiments, sensitive data storage comprises token 306 and corresponding data 308, token 310 and corresponding data 312, and token 314 and corresponding data 316. In various embodiments, sensitive data storage 304 comprises 1, 6, 800, or any number of token-data pairs. In some embodiments, a token and corresponding data is stored in a hashed key-value pair in sensitive data storage 304. In some embodiments, only sensitive data is stored in sensitive data storage and a token contains information on the exact memory location of the sensitive data. In various embodiments, the sensitive data is stored as an opaque data block of JSON (JavaScript Object Notation) code, bytes, encrypted bytes, or another data format. In some embodiments, the policy information is stored in an application server. In some embodiments, sensitive data is received via interface 301. In some embodiments, token generator 302 generates a token to store with incoming sensitive data. In some embodiments, token generator 302 provides the token to an application server to be stored in the application server in lieu of the sensitive data. In some embodiments, sensitive data is provided via interface 301 upon a request for the data by an allowed party and using a token (e.g., token 306, token 310, and token 314).

Figure 4A:
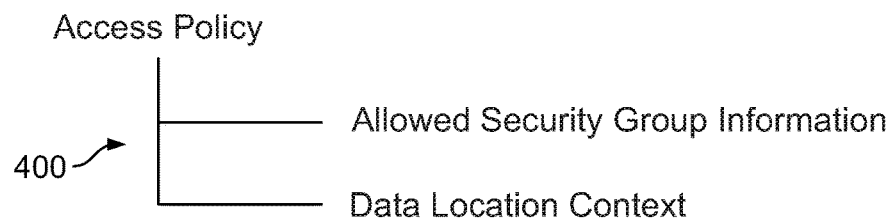
FIG. 4A is a diagram illustrating an embodiment of an access policy.

FIG. 4A is a diagram illustrating an embodiment of an access policy. In some embodiments, access policy 400 is stored on an application server (e.g., application server system 112 of FIG. 1). In the example shown, access policy 400 comprises allowed security group information and a data location context. Allowed security group information comprises information on one or more security groups allowed data access. In various embodiments, a security group is based on one or more of the following: an IP address, a location context, a client organization information, or any other appropriate requestor-based factors. For example, data requestors with an IP address within a certain range are defined as a security group. In some embodiments, users with high security clearance are included in an organization based security group. In some embodiments, clients with a location in a specific country, country region, or country sub-region are defined as a security group. In some embodiments, a data requestor location is determined via a global positioning system (GPS) signal. In some embodiments, a multi-factor verification is required to confirm a requestor identity—for example, an online log-in triggers a confirmation code to a user's mobile device that the user enters on the webpage. In some embodiments, an access policy comprises multiple sets of security groups—for example, a set of security groups allowed read access to the data, a set of security groups allowed to modify the data, a set of security groups allowed to store sensitive data, and/or a set of security groups allowed to delete the data. In some embodiments, a system for sensitive data access is used to allow or deny requests to modify, to delete, or to store data. In some embodiments, a requestor security group is determined based at least in part on the requestor information.

In the example, shown, access policy 400 comprises a data location context. In some embodiments, the data location context comprises the location to which access policy 400 pertains. In some embodiments, the location context comprises the location sensitive data was entered. For example, an access policy that pertains to data that are entered in South America has South America specified as part of the access policy.

Figure 4B:
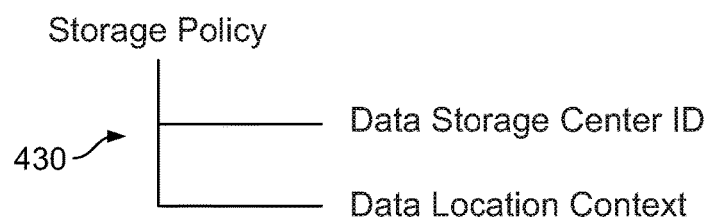
FIG. 4B is a diagram illustrating an embodiment of a storage policy.

FIG. 4B is a diagram illustrating an embodiment of a storage policy. In some embodiments, storage policy 430 is stored on an application server (e.g., application server system 112 of FIG. 1). In some embodiments, sensitive data is stored in a data storage center specified by a storage policy (e.g., storage policy 430). In the example shown, storage policy 430 comprises a data storage center ID and a data location context. In some embodiments, a storage policy is assigned to a data set. In some embodiments, the assigned storage policy comprises a data location context. In some embodiments, a data location context of a storage policy comprises the location that the storage policy pertains to. In some embodiments, the location context comprises the location sensitive data was entered. For example, a storage policy that pertains to data entered in Korea has Korea specified as part of the storage policy. In some embodiments, the assigned storage policy comprises an identifying information on a data storage center that is associated with a data storage center ID.

Figure 4C:
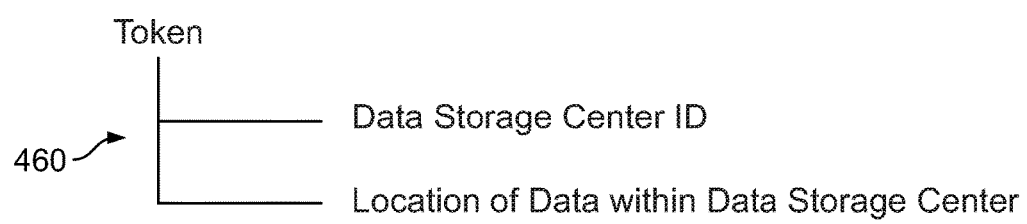
FIG. 4C is a diagram illustrating an embodiment of a token.

FIG. 4C is a diagram illustrating an embodiment of a token. In some embodiments, token 400 is stored in a data storage center (e.g., a storage center of data storage system 200 of FIG. 2). In the example shown, token 460 comprises a data storage center ID and a location of data within the data storage center. The data storage center ID comprises identifying information on a data storage center. In some embodiments, the data storage center is identified by a uniform resource identifier. In some embodiments, the data location comprises a unique, secure, random identification. For example, a token "/SDS1/11233445" describes storage center "SDS1" and random ID "11233445" identifies sensitive data located within SDS1.

Figure 5:
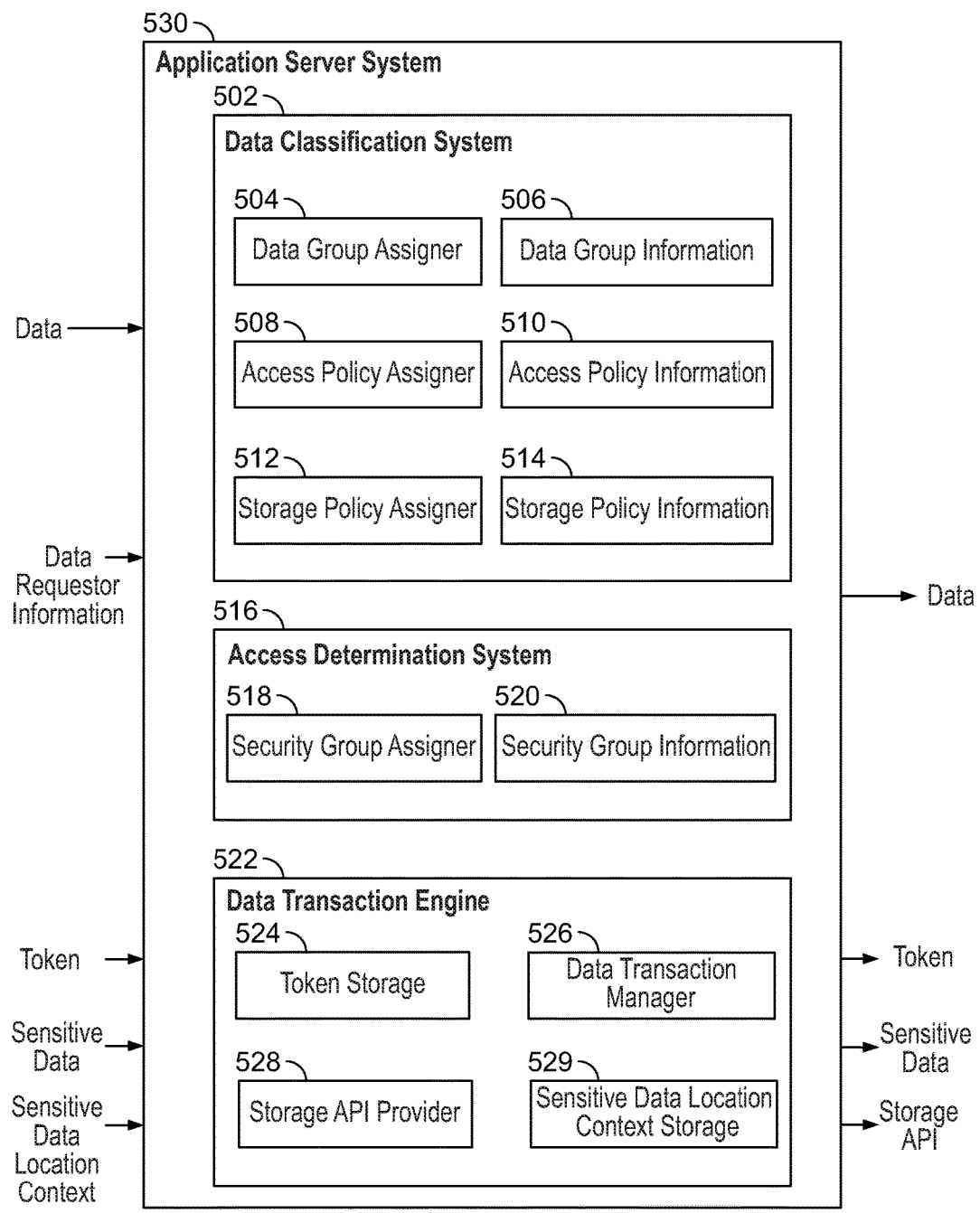
FIG. 5 is a block diagram illustrating an embodiment of an application server system.

FIG. 5 is a block diagram illustrating an embodiment of an application server system. In some embodiments, application server system 530 comprises application server system 112 of FIG. 1. In the example shown, application server system 530 comprises data classification system 502, access determination system 516, data transaction engine 522, and storage application programming interface (API) provider 528. In some embodiments, data classification system 502 receives data and a data location context from a client via an interface. In some embodiments, data classification system 502 comprises data group assigner 504, data group information 506, access policy assigner 508, access policy information 510, storage policy assigner 512, and storage policy information 514. In some embodiments, data group assigner 504 determines whether incoming data belongs to a data group using data group information 506. In some embodiments, assignable data groups comprise a data group comprising sensitive data configured to have an access policy or storage policy but not an assignable access policy due to location context, a non-sensitive data group, or a data group not configured to have an access policy. In some embodiments, an assignable data group has an associated storage and/or access policy. In various embodiments, a data group is assigned an associated storage and/or access policy by a developer or a client. In some embodiments, assigning a data group an associated storage and/or access policy optimizes the data storage and/or access. For example, sensitive data from a first location set (e.g., a region—for example, South East Asia, a country, etc.) is assigned to be stored in a second location set (e.g., a country—for example, Thailand, a region, etc.) and accessed only by clients located in a third location set (e.g., a region—for example, South East Asia, a country, etc.). In this case, data that is classified by data classification system 502 to be sensitive data from a first location set (e.g., a region—for example, South East Asia, a country, etc.) will be assigned the corresponding storage and access policies.

In some embodiments, a processor of the application server determines whether the data has an assignable access policy. In some embodiments, the assigned access policy has a data location context matching the received data location context. In some embodiments, the processor determines whether the data has an assignable storage policy. In some embodiments, the assigned storage policy has a data location context matching the received data location context. In some embodiments, access policy assigner 508 and storage policy assigner 512 use the incoming data location context and access policy information 510 and storage policy 514 to assign an access and/or a storage policy to the data based on the data location context. In some embodiments, the assigned access policy has a data location context matching the retrieved data location context. In some embodiments, the assigned storage policy has a data location context matching the received data location context. In some embodiments, the incoming data is determined to have a data location context that does not match the data location context of any access policies in access policy information 510, and the data is stored according to a non-sensitive flow because no corresponding access policy is defined. In some embodiments, the assigned storage policy or the assigned access policy is determined by a client. For example, the client enters or modifies access policies for location contexts. In some embodiments, the data is determined to be configured to have an assigned access policy and an assigned storage policy. In some embodiments, the data is then stored in a sensitive data storage system.

In some embodiments, access determination system 516 comprises security group assigner 518 and security group information 520. In some embodiments, application server system 530 receives data requestor information comprising information on a client requesting access to read, modify, store, or delete sensitive data. In some embodiments, a requestor security group is determined based at least in part on the requestor information. In some embodiments, the requestor information is evaluated to determine whether the requestor belongs to a security group allowed data access. In some embodiments, security group assigner 518 assigns one or more security groups to a requestor based on security group information 520 and requestor information. In various embodiments, a security group is based on one or more of the following: an IP address, a location context, a client organization information, or any other appropriate information. In some embodiments, the security group is assigned to the data based on a data location information—for example, requestor data location information that indicates the data requestor is located in a location (e.g., a region, country, etc.—for example, South America) results in the security group associated with that location to be assigned to the data requestor. In some embodiments, a security group is defined as part of multiple access policies. For example, the location security group is defined as a part of the read and store access policies for a given location's sensitive data (e.g., South American sensitive data). In some embodiments, access to sensitive data is approved after determining a requestor is part of a security group and data transaction engine 522 retrieves the sensitive data and provides it to the requestor, or allows the requestor to perform the requested modification, storage, or deletion.

In some embodiments, data transaction engine 522 comprises token storage 524, data transaction manager 526, storage application programming interface (API) provider 528, and sensitive data location context 529. In some embodiments, sensitive data location context storage 529 stores the location context of sensitive data that has been stored in a data storage system. In some embodiments, sensitive data location context storage 529 is accessed when a client requests to read the sensitive data in order to determine a matching storage policy and a matching access policy. In some embodiments, token storage 524 stores tokens provided by a data storage system upon storing sensitive data. In some embodiments, a token in token storage 524 comprises sensitive data storage location information and is used to retrieve sensitive data. In some embodiments, storage API provider 528 provides a storage API to a storage center. In some embodiments, the API enables the storage center to store data with a corresponding token and retrieve data using a token. In some embodiments, data transaction manager 526 manages data transfer between the application server and storage or client systems.

Figure 6:
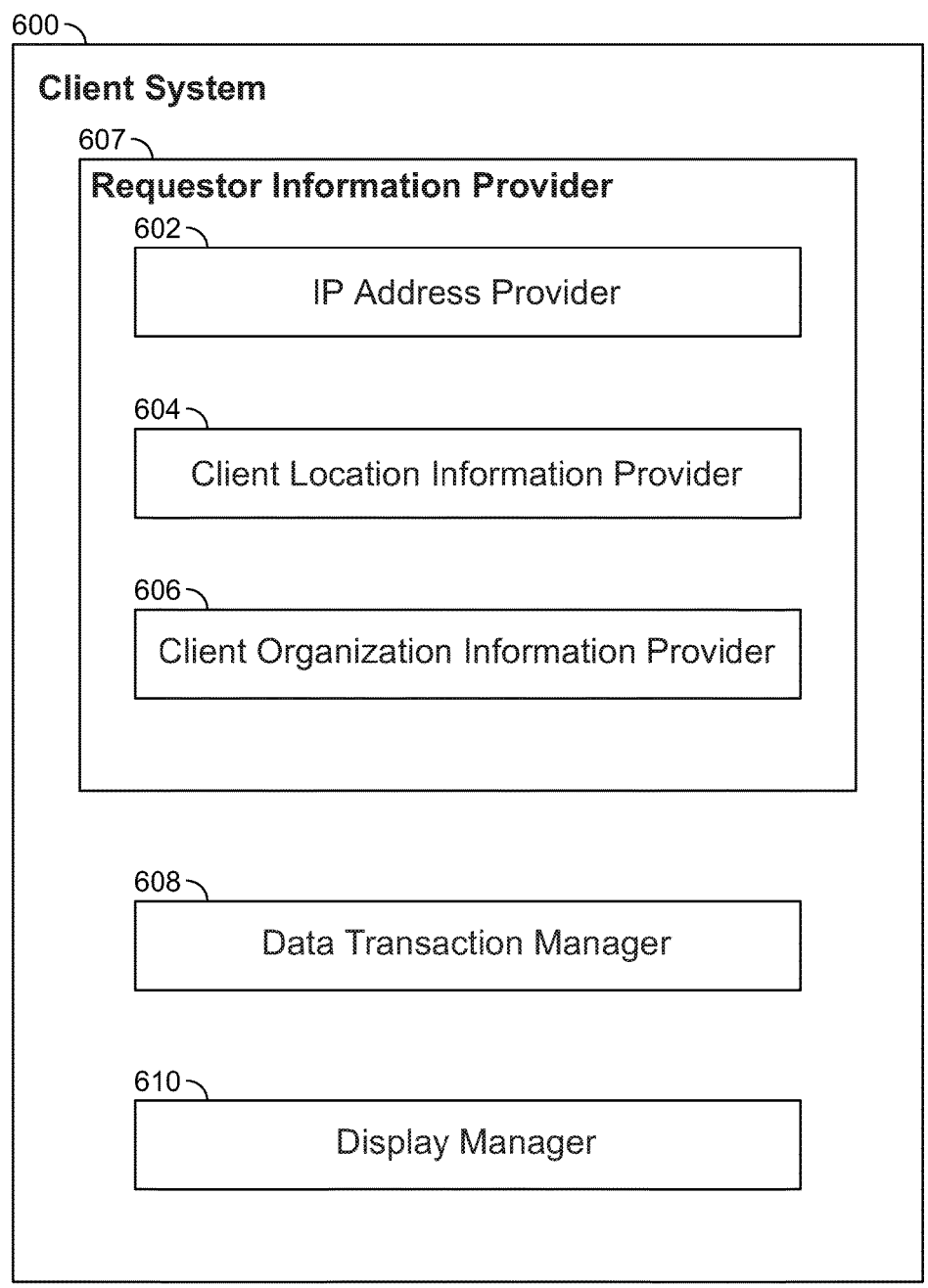
FIG. 6 is a block diagram illustrating an embodiment of a client system.

FIG. 6 is a block diagram illustrating an embodiment of a client system. In some embodiments, client system 104 of FIG. 1 implements client system 600. In the example shown, client system 600 comprises requestor information provider 607. Requestor information provider 607 comprises internet protocol (IP) address provider 602. In some embodiments, IP address provider 602 provides the IP address of the requestor, which identifies a device participating in a computer network. Requestor information provider 607 comprises client location information provider 604, which provides location on a client requestor location. In various embodiments, client location information provider 604 obtains a client location via a GPS signal, a two-factor authentication, a client profile information, an IP address as provided by IP address provider 602, or any other appropriate location information provider. Requestor information provider 607 comprises client organization information provider 606, which provides client organization information. In various embodiments, client organization information comprises a security clearance level, authority level information, professional organization such as an organization comprising human relations professionals, or any other appropriate information. Client system 600 comprises data transaction manager 608. In various embodiments, data transaction manager 608 allows a client to enter sensitive data, provides sensitive data to a client, receives client data, provides sensitive data to an application server system, or manages any other appropriate transaction. Client system 600 comprises display manager 610, which provides a display to a client. In some embodiments, display manager 610 displays sensitive data to a client. In some embodiments, display manager 610 displays an interface for a client to enter data. In some embodiments, data transaction manager 608 and/or display manager 610 comprise an interface.

Figure 7:
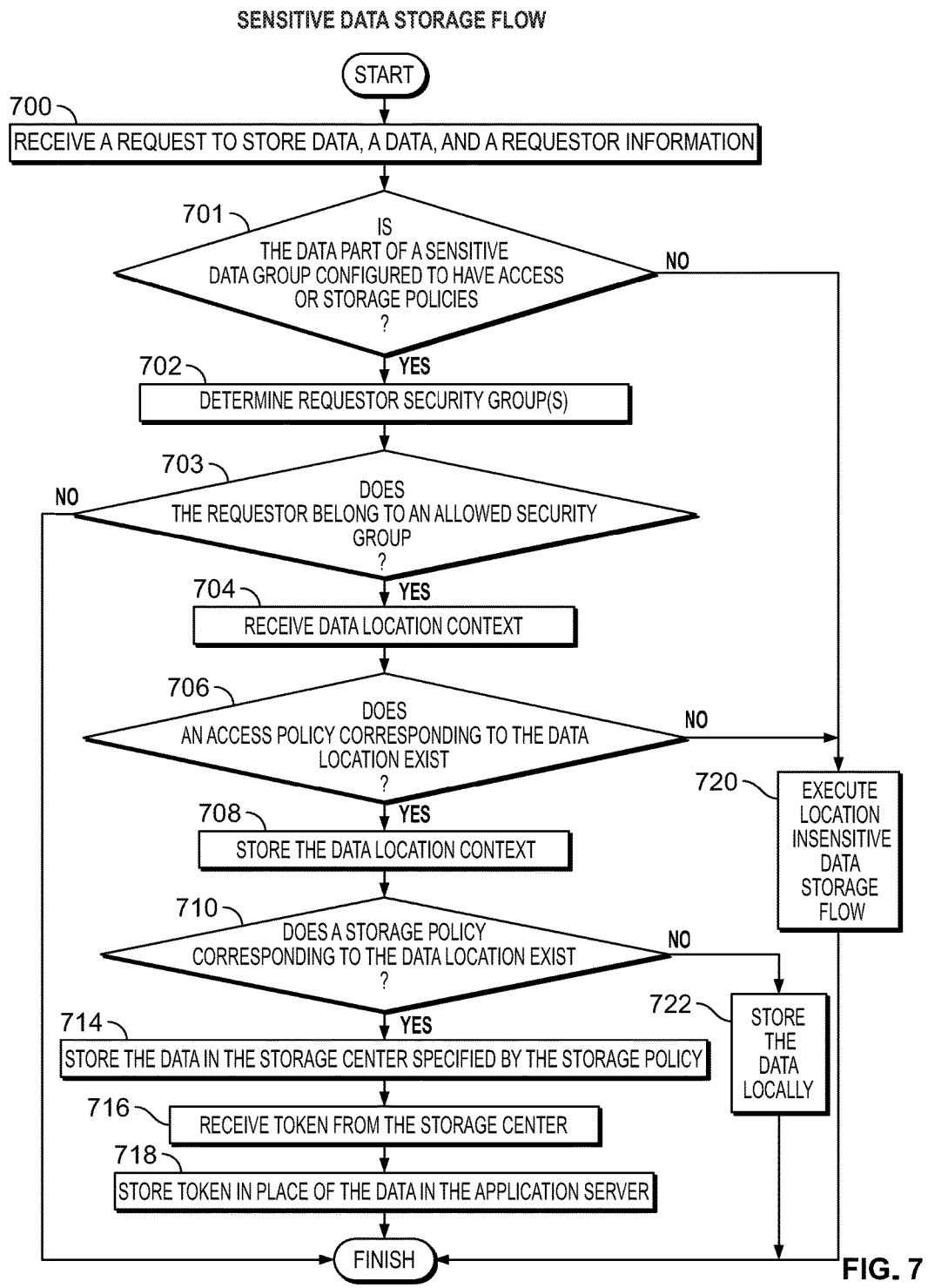
FIG. 7 is a flow diagram illustrating an embodiment of a process for sensitive data storage.

FIG. 7 is a flow diagram illustrating an embodiment of a process for sensitive data storage. In some embodiments, the process of FIG. 7 is executed using an application server (e.g., application server system 112 of FIG. 1). In the example shown, in 700 a request to store data, a data, and a requestor information are received. In some embodiments, the data comprises a data class, an attribute, or a relationship definition. In some embodiments, the data comprises data model elements. In various embodiments, an application developer or a client assigns data model elements to sensitive data groups. In some embodiments, sensitive data groups are configured to enable masking of the sensitive data model elements to a client. For example, a client date of birth is defined as sensitive by a developer, causing a user to see "*" rather than the date of birth. In 701, it is determined whether the data is part of a sensitive data group configured to have access or storage policies. In some embodiments, a data group is determined for the data. In some embodiments, an access policy and/or a storage policy are assigned to the data based on the data group. In the event that the data is not part of a sensitive data group configured to have access or storage policies, then control passes to 720. In the event that the data is part of a sensitive data group configured to have access or storage policies, then in 702, requestor security group(s) are determined. For example, the processor determines the one or more security groups to which the requestor belongs based on the requestor information. In 703, it is determined whether the requestor belongs to an allowed security group. For example, the security groups that the user is a member of. In various embodiments, the security group comprises an organization group (e.g., if the user belongs to a given organization), a dynamic IP group (e.g., if the IP address associated with the user's access system belongs to a security group), a location based group (e.g., if the IP address is associated with a location that belongs to a security group), or any other appropriate security group. In the event that the requestor does not belong to an allowed security group, the request to store data cannot be fulfilled and the process is finished. In the event that the requestor belongs to an allowed security group, in 704 data location context is received. In 706, it is determined whether an access policy corresponding to the data location exists. For example, a received data set with a location context of a specific country or region (e.g., Zambia, North America, etc.) is configured to have storage and access policies but the data group the data set belongs to does not have pre-assigned policies. In the event that there is no existing access policy corresponding the data location, then in 720 a location insensitive data storage flow is executed, and the process ends. For example, data is stored locally in a system memory in a local database. In some embodiments, assigning a storage policy without assigning an access policy does not occur and 706 and 720 are omitted. In the event that there is an existing access policy corresponding to the data location, then in 708 the data location context is stored. For example, the data location context is stored in the application server system such that it is accessed in the event that a client requests access to the data. In 710, it is determined whether a storage policy corresponding to the data location exists. In the event that a corresponding policy does not exist, the data is stored locally in step 722 and the process ends. In some embodiments, the data is stored locally to optimize the storage process in lieu of a specified storage location. In some embodiments, the data is stored in an application server system. In the event that a corresponding storage policy does exist, in 714 the data is stored in a data storage center based at least in part on the storage policy. In 716, the server system receives a token from the storage center. For example, a token is provided by the data storage center. In 718**, the token in place of the data, and the process ends. For example, the application system stores the token in place of the data. In some embodiments, the token is stored in a memory location different from the memory location the data is stored.

Figure 8:
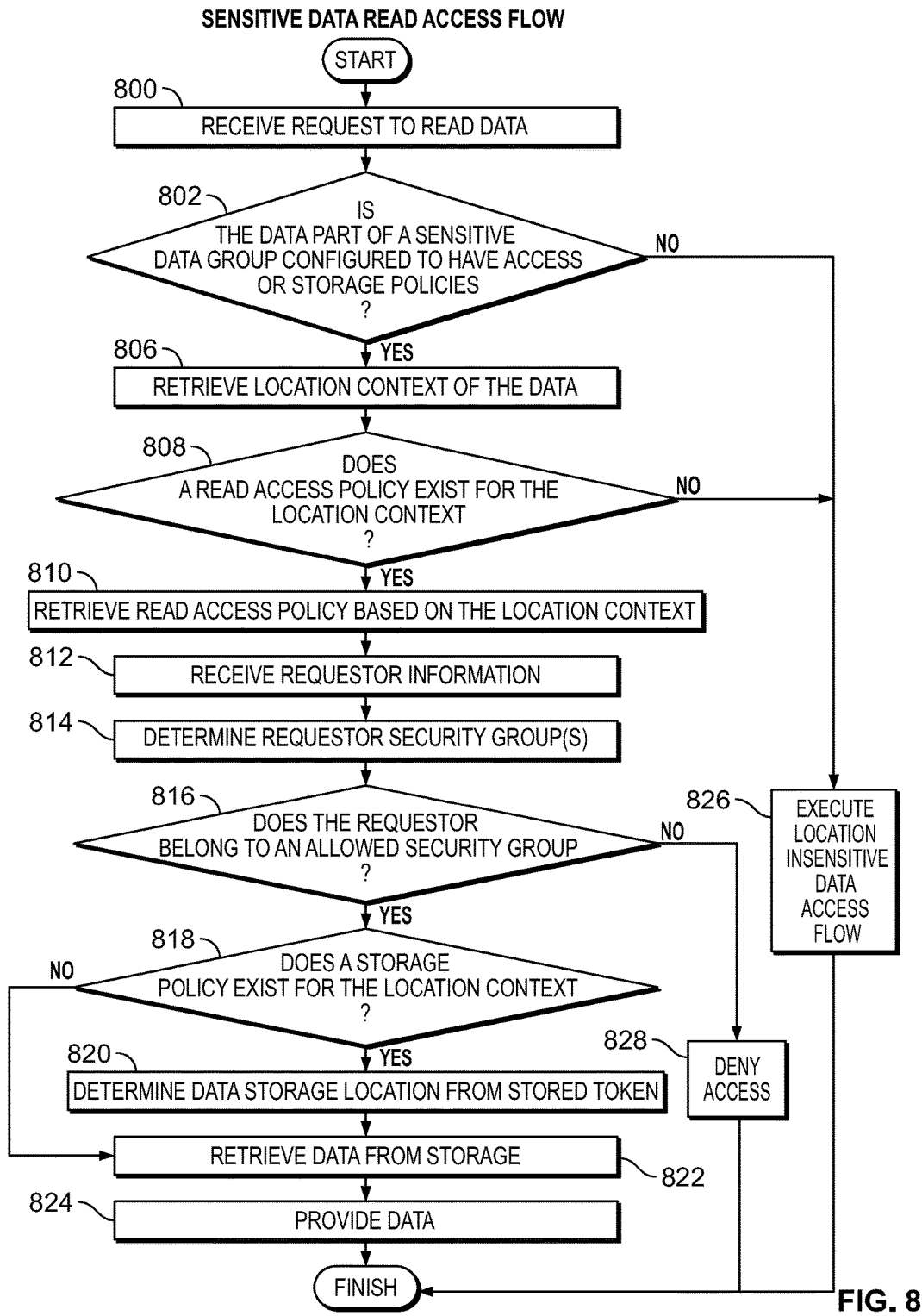
FIG. 8 is a flow diagram illustrating an embodiment of a process for sensitive data read access.

FIG. 8 is a flow diagram illustrating an embodiment of a process for sensitive data read access. In some embodiments, the process of FIG. 8 is executed using an application server (e.g., application server system 112 of FIG. 1). In the example shown, in 800 a request to read data is received. In 802, it is determined whether the data is part of a sensitive group configured to have an assigned access policy and an assigned storage policy. In the event that the data is not part of a sensitive data group, in 826 a location insensitive data access flow is executed, and the process ends. In the event that the data is part of a sensitive data group, in 806 a location context is retrieved. For example, the location context is retrieved for the data requested. In 808, it is determined whether a read access policy exists for the location context. In the event that a read access policy does not exist for the location context, control passes to 826. In the event that a read access policy does exist for the location context, then in 810 the corresponding read access policy is retrieved based on the data location context. In 812, requestor information is received. In 814, the requestor security group(s) are determined. In 816, it is determined whether the requestor belongs to an allowed security group. In the event that the requestor does not belong to an allowed security group, access is denied in 828 and the flow is ended. In the event that the requestor is determined to belong to an allowed security group, it is determined whether a storage policy exists for the data location context in step 818. In the event that a corresponding policy exists, the data storage location is determined from a stored token in step 820. In the event that a corresponding storage policy does not exist, in 822 data is retrieved from storage. In 824, the data is provided. In some embodiments, retrieving the data comprises decrypting a stored sensitive data.

Figure 9:
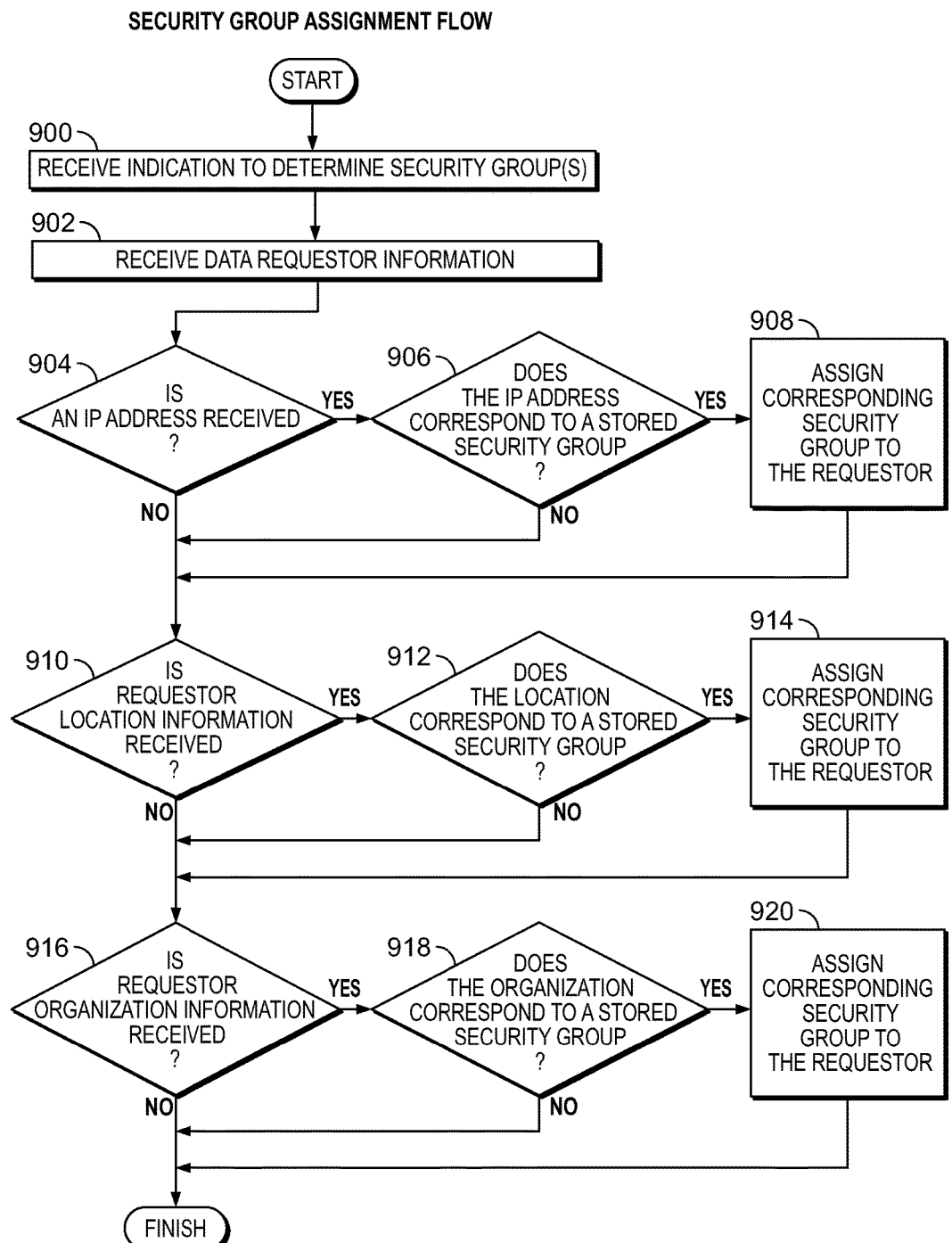
FIG. 9 is a flow diagram illustrating an embodiment of a process for security group assignment.

FIG. 9 is a flow diagram illustrating an embodiment of a process for security group assignment. In some embodiments, the process of FIG. 9 is executed using an application server (e.g., application server system 112 of FIG. 1). In the example shown, in 900, an indication to determine security group(s) is receive. For example, an application server system receives an indication to determine a security group for a client or requestor. In 902, data requestor information is received. In 904, it is determined whether an IP address was received. In the event that an IP address was received, in 906, it is determined whether the IP address corresponds to a stored security group. In the event that the IP address has a corresponding stored security group, in 908, the corresponding security group is assigned to the requestor. Step 910 follows step 908. Step 910 follows step 904 or 906 in the event that an IP address was not received or the received IP address does not correspond to a stored security group.

In 910, it is determined whether requestor location information was received. In the event that requestor location information was received, in 912, it is determined whether the requestor location information corresponds to a stored security group. In the event that the requestor location information has a corresponding stored security group, in 914, the corresponding security group is assigned to the requestor. Step 916 follows step 914. Step 916 follows step 910 or 912 in the event that requestor location information was not received or the received requestor location information does not correspond to a stored security group.

In 916, it is determined whether requestor organization information was received. In the event that requestor location information was received, in 918, it is determined whether the requestor organization information corresponds to a stored security group. In the event that the requestor organization information has a corresponding stored security group, in 920, the corresponding security group is assigned to the requestor. The process is finished following 920. The process is finished following step 910 or 912 in the event that requestor organization information was not received or the received requestor organization information does not correspond to a stored security group.

Figure 10:
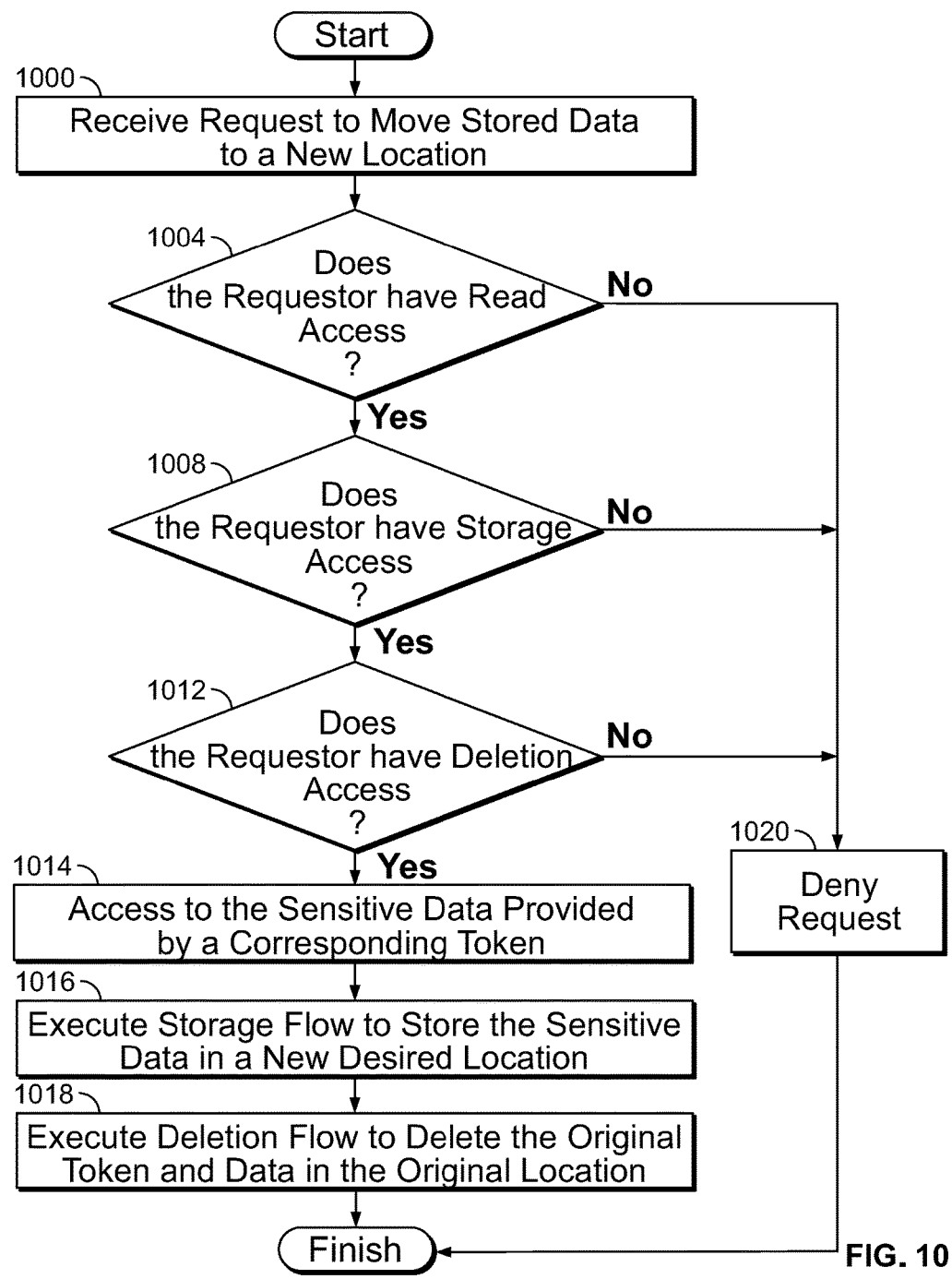
FIG. 10 is a flow diagram illustrating an embodiment of a process for sensitive data storage location transfer.

FIG. 10 is a flow diagram illustrating an embodiment of a process for sensitive data storage location transfer. In some embodiments, the process of FIG. 10 is executed using an application server (e.g., application server system 112 of FIG. 1). In some embodiments, the process of transferring sensitive data from one storage location to another comprises reading the sensitive data, storing it in another location, and deleting the data in the original location. In some embodiments, the sensitive data comprises data stored according to a storage policy and configured to have an assignable access policy. In the example shown, in 1000, a request is received to move stored data to a new location. For example, an application server is received to move stored data to a new location by a requestor. In 1004, it is determined whether the requestor has read access. In 1008, it is determined whether the requestor has storage access. In 1012, it is determined whether the requestor has deletion access, and control passes to 1014. In various embodiments, certain security groups are allowed read, storage, deletion access based on organizational or location factors, or any other appropriate permissions. In the event that a requestor does not have one of the three accesses (e.g., step 1004, 1008, or 1012), the request to transfer data is denied in 1020 and the process is finished. In 1014, access to the sensitive data is provided by a corresponding token. In 1016, a storage flow is executed to store the sensitive data in a new desired location. In 1018, a deletion flow is executed to delete the original token and data in the original location, and the process is finished. In some embodiments, a sensitive data location transfer is enacted in response to changing sensitive data legislation. In some embodiments, sensitive data location transfer is implemented by a background conversion process to migrate the data.

Figure 11:
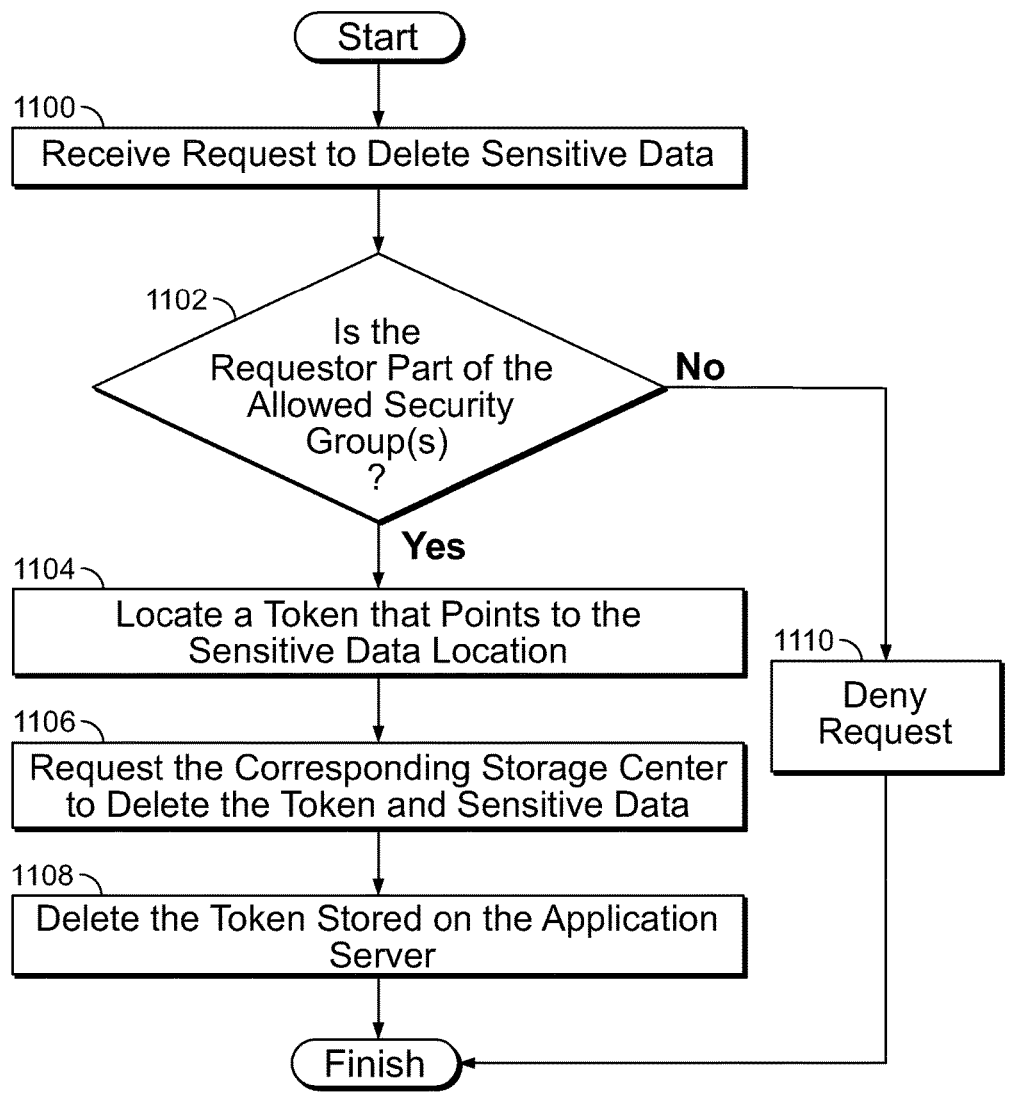
FIG. 11 is a flow diagram illustrating an embodiment of a process for application server initiated sensitive data deletion.

FIG. 11 is a flow diagram illustrating an embodiment of a process for application server initiated sensitive data deletion. In some embodiments, the process of FIG. 11 is executed using application server system 112 of FIG. 1. In the example shown, in 1100, a request to delete sensitive data is received. In 1102, it is determined whether the requestor is part of the security group(s) allowed. For example, it is determined whether the requestor has permission to delete sensitive data. In the event that the requestor is not part of the required security group(s), the request to delete is denied in 1110, and the process ends. In the event that the requestor is part of the allowed security group(s), a token that points to the sensitive data location is located in step 1104. In some embodiments, the token is stored in the application server system. In 1106, the corresponding storage center is requested to delete the token and sensitive data. In 1108, the token stored on the application server is deleted and the process is finished.

Figure 12:
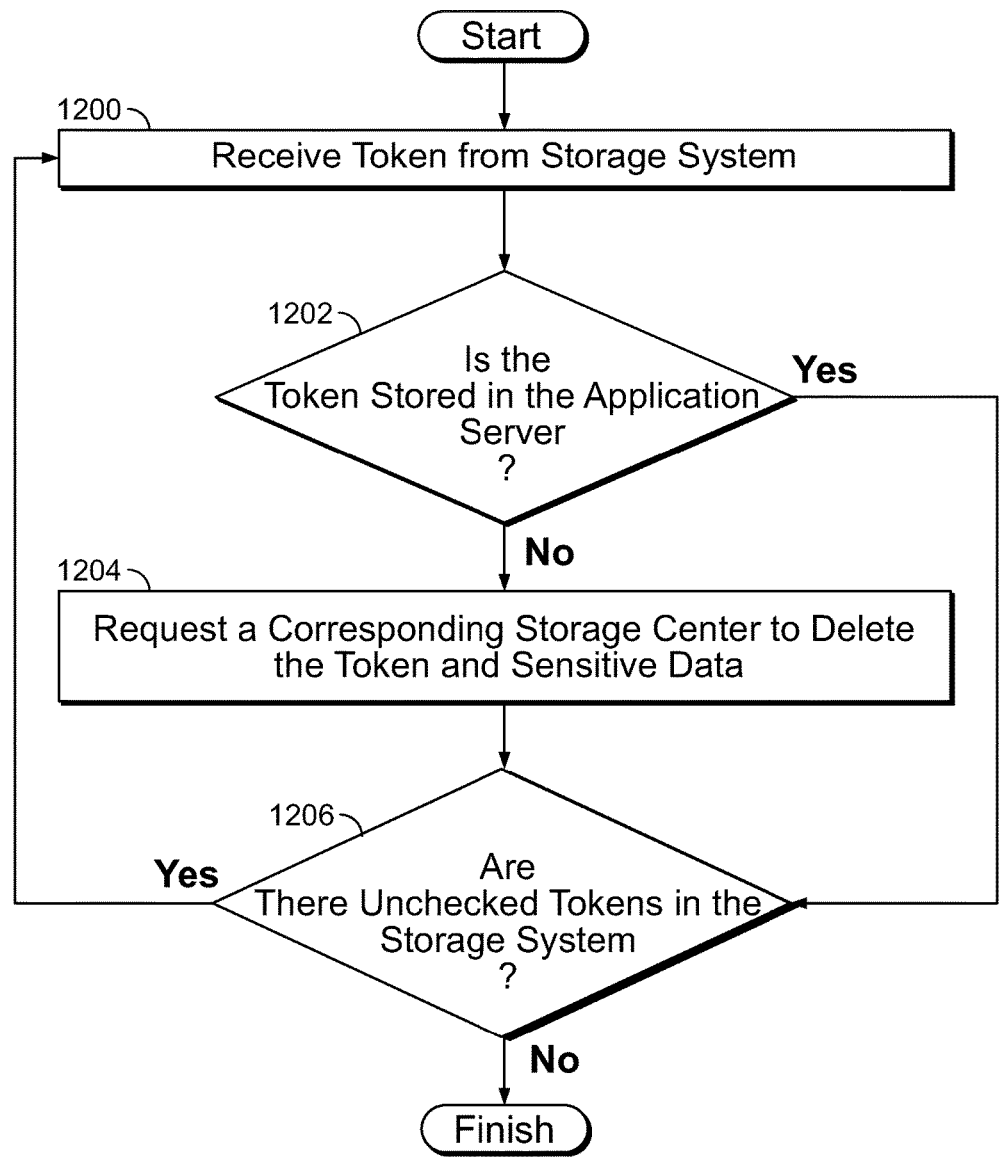
FIG. 12 is a flow diagram illustrating an embodiment of a process for storage system initiated sensitive data deletion.

FIG. 12 is a flow diagram illustrating an embodiment of a process for storage system initiated sensitive data deletion. In some embodiments, the process of FIG. 12 is executed using application server system 112 of FIG. 1. In the example shown, in 1200 a token is received from a storage system. In 1202, it is determined whether the token is stored in the application server system. In the event that the token is stored in the application server, control passes to 1206. In the event that the token is not stored in the application server, in step 1204, a corresponding storage center is requested to delete the token and sensitive data. In some embodiments, the absence of the token in the application server system signifies that the sensitive data is not being used or has no context. In 1206, it is determined whether there are unchecked tokens in the storage system. In the event that there are unchecked tokens, the control passes to 1200. In the event that there are not unchecked tokens, the process ends.

In some embodiments, the deletion flows of FIG. 11 and FIG. 12 are used to modify sensitive data. For example, sensitive data to be modified is deleted and then an updated version of the data is stored. In some embodiments, the sensitive data is not directly modified due to the immutability of token-data pairs in the storage system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for accessing data, comprising:
an interface to receive a request to access data and requestor information; and
a processor to:
retrieve a location context of the data, wherein the location context of the data comprises one or more of an access policy location to which the access policy applies, and an entry location the data was entered;
determine whether the data comprises sensitive data configured to have an assigned access policy and an assigned storage policy, comprising determining whether the assigned access policy has a first location context that matches the location context of the data, and determining whether the assigned storage policy has a second location context that matches the location context of the data, wherein the assigned access policy comprises information on one or more security groups allowing or denying data access;
in response to a sensitive data determination that the data comprises sensitive data configured to have the assigned access policy and the assigned storage policy:
determine whether access is allowed by the assigned access policy based at least in part on the requestor information; and
in response to an access determination that access is allowed:
retrieve the data based on information provided by a token; and
provide the data.

2. The system of claim 1, wherein the requestor information comprises one or more of the following: an IP address, a requestor location context, or a client organization information.

3. The system of claim 1, wherein the data comprises a data class, an attribute, or a relationship definition.

4. The system of claim 1, wherein a security group of the one or more security groups is associated with one or more of the following: an IP address, a security group location context, or a client organization information.

5. The system of claim 1, wherein a requestor security group is determined based at least in part on the requestor information.

6. The system of claim 1, wherein the requestor information is evaluated to determine whether a requestor belongs to a security group that has allowed data access.

7. The system of claim 1, wherein the token comprises identifying information on a data storage center.

8. The system of claim 1, wherein the token comprises identifying information on a data location within a data storage center.

9. The system of claim 1, wherein retrieving the data comprises decrypting a stored sensitive data.

10. The system of claim 1, wherein accessing data comprises one of the following: modifying, deleting, or storing data.

11. The system of claim 1, wherein the data is transferred from a storage location to a new data storage location.

12. A method for accessing data, comprising:
receiving a request to access data and requestor information;
retrieving a location context of the data, wherein the location context of the data comprises one or more of an access policy location to which the access policy applies, and an entry location the data was entered;
determining, using a processor, whether the data comprises sensitive data configured to have an assigned access policy and an assigned storage policy, comprising determining whether the assigned access policy has a first location context that matches the location context of the data, and determining whether the assigned storage policy has a second location context that matches the location context of the data, wherein the assigned access policy comprises information on one or more security groups allowing or denying data access;
in response to a sensitive data determination that the data comprises sensitive data configured to have an assigned access policy and an assigned storage policy:
determining whether access is allowed by the assigned access policy based at least in part on the requestor information; and in response to an access determination that access is allowed:
   retrieving the data based on information provided by a token; and
   providing the data.

13. A computer program product for accessing data, the computer program product being embodied in a non-transitory computer readable storage medium and comprising computer instructions for:
   receiving a request to access data and requestor information;
   retrieving a location context of the data, wherein the location context of the data comprises one or more of an access policy location to which the access policy applies, and an entry location the data was entered;
   determining, using a processor, whether the data comprises sensitive data configured to have an assigned access policy and an assigned storage policy, comprising determining whether the assigned access policy has a first location context that matches the location context of the data, and determining whether the assigned storage policy has a second location context that matches the location context of the data, wherein the assigned access policy comprises information on one or more security groups allowing or denying data access;
   in response to a sensitive data determination that the data comprises sensitive data configured to have an assigned access policy and an assigned storage policy:
   determining whether access is allowed by the assigned access policy based at least in part on the requestor information; and
   in response to an access determination that access is allowed:
      retrieving the data based on information provided by a token; and
      providing the data.

\* \* \* \* \*